Patented Aug. 26, 1941

2,254,009

UNITED STATES PATENT OFFICE 2,254,009

SYMMETRICAL DI-2-OCTYL-GUANIDINE

Ingenuin Hechenbleikner, Stamford, Conn., assignor to American Cyanamid Company, New York, N. Y., a corporation of Maine No Drawing. Application April 24, 1940,
Serial No. 331,386

1 Claim. (Cl. 260—564)

The present invention relates to symmetrical di-2-octyl guanidine.

The above compound may be readily prepared from 2-amino-octane and cyanogen chloride in an organic solvent.

Symmetrical di-2-octyl guanidine is useful as an insecticide, moth larvae repellent and as an intermediate.

It may be prepared as follows: 20 grams (0.051 mol) of 2-amino-octane was dissolved in 50 cc. of heptane, cooled to 0° C. and a solution of 4.4 grams (0.072 mol) of cyanogen chloride dissolved in 36 cc. of heptane added thereto slowly. The mixture was allowed to remain at room temperature for five minutes and then heated under reflux for twelve hours. Two layers had separated at the end of this period. The hydrocarbon layer was decanted from the semi-solid guanidine hydrochloride. The hydrochloride was insoluble in water but soluble in alcohol. The alcoholic solution thereof was treated with dilute hydrochloric acid to dissolve any unchanged amine and then thrown out of solution with water. The hydrochloride was again dissolved in alcohol and treated with excess caustic soda. The guanidine base formed was precipitated from the alcoholic solution by means of water.

As a result, a light-colored viscous liquid was produced which, when dissolved in petroleum ether, dried with sodium sulfate, concentrated by evaporation of the petroleum ether under 15 mm. pressure and finally at 1 mm. pressure, was identified as symmetrical di-2-octyl guanidine.

While the invention has been described with particular reference to specific embodiments, it is to be understood that it is not to be limited thereto but is to be construed broadly and restricted solely by the scope of the appended claim.

I claim:

Symmetrical di-2-octyl guanidine.

INGENUIN HECHENBLEIKNER.